United States Patent Office 3,027,283
Patented Mar. 27, 1962

3,027,283
SOLID COMPOSITE PROPELLANT CONTAINING HALOGENATED OLEFIN
Charles C. Bice, Bartlesville, Okla., assignor to Phillips Petroleum Company, a corporation of Delaware
No Drawing. Filed Dec. 29, 1958, Ser. No. 783,616
18 Claims. (Cl. 149—19)

This invention relates to solid propellant compositions. In one aspect, this invention relates to solid propellant compositions containing a processing aid.

Solid propellants can be classified with respect to composition as double base type, single base type, and composite type. An example of a double base propellant is "ballistite" which comprises essentially nitroglycerine and nitrocellulose. Examples of single base propellants are nitrocellulose and trinitrotoluene. Composite type propellants are generally composed of an oxidizer, and a binder or fuel. Said composite propellants may contain other materials to facilitate manufacture or increase ballistic performance such as a burning rate catalyst.

Rocket propellants have achieved considerable commercial importance as well as military importance. Jet propulsion motors of the type in which the propellants of this invention are applicable can be employed to aid a heavily loaded plane in take off. Said motors can also be employed as an auxiliary to the conventional power plant when an extra surge of power is required. Said motors can also be employed to propel projectiles and land vehicles. Said propellants can also be used for uses other than propulsion. For example, they can be used as gas generators in starting devices, power units where a fluid is employed as a motive force, and other applications where a comparatively large volume of gas is required in a relatively short period of time.

Recently, it has been discovered that superior solid propellant materials are obtained comprising a solid oxidant such as ammonium nitrate or ammonium perchlorate, and a rubbery material such as a copolymer of butadiene and a vinylpyridine or other substituted heterocyclic nitrogen base compound, which after incorporation is cured by a quaternization reaction or a vulcanization reaction. Solid propellant mixtures of this nature and a process for their production are disclosed and claimed in copending application Serial No. 284,447, filed April 25, 1952, by W. B. Reynolds and J. E. Pritchard.

Some solid propellant compositions of the composite type are very difficult, if not possible, to mix by a dry mix method. Even if other mixing procedures are successful, such as a solvent mixing technique, it is not always possible to extrude the material. The flow properties of high oxidizer content solid propellant compositions frequently are such that said compositions cannot be extruded by conventional methods. An example of such compositions are those containing from about 86 to 94 parts by weight of oxidizer, together with other ingredients such as burning rate catalysts, high energy additive, etc., all of said ingredients being dispersed in a binder material, the content of which may be as low as 3.5 parts by weight, based on the total propellant composition. In the use of such propellants as gas generators, and particularly for the propulsion of rockets and other missiles, maximum performance per unit weight of propellant is highly important. However, due to the above-described difficulties with many compositions, good performance is often sacrificed in order to obtain a composition which can be readily processed and which can be readily formed by extrusion.

I have found that such difficulty processable propellant compositions can be extruded in conventional extrusion apparatus by incorporating therein, as a processing aid, a polymer of a highly halogenated olefin as defined further hereinafter. Said polymers of highly halogenated olefins also aid in the mixing of the propellant ingredients, i.e., the incorporation of the oxidizer and other "dry" components into the binder component, when said mixing is carried out by the so-called "dry mixing" technique. Said polymers of highly halogenated olefins in many instances function as a plasticizer and actually permit a decrease in the amount of necessary binder component. In the preparation of solid propellant compositions, it is sometimes desirable in particular instances to compression mold the propellant grain rather than form said grain by extrusion. I have also found that said polymers of highly halogenated olefins serve as a mold release agent when incorporated in solid propellant compositions from which grains are formed by compression molding. Said polymers facilitate the removal of the finished grain from the mold. Thus, said polymers of highly halogenated olefins are referred to herein as processing aids.

Thus, broadly speaking, the present invention resides in propellant compositions comprising an oxidizer component, a binder component, and as a processing aid, at least one polymer of a halogenated olefin as defined further hereinafter.

An object of this invention is to provide an improved propellant composition. Another object of this invention is to provide a processing aid for use in the manufacture of solid propellants. Still another object of this invention is to provide a solid propellant composition having a polymer of a highly halogenated olefin incorporated therein. Other aspects, objects, and advantages of the invention will be apparent to those skilled in the art in view of this disclosure.

Thus, according to the invention, there is provided a propellant composition comprised of: an oxidizer component selected from the group consisting of ammonium nitrate, the alkali metal nitrates, ammonium perchlorate, the alkali metal perchlorates, and mixtures thereof; a binder component comprising a rubbery polymer; and a polymer of a highly halogenated olefin as a processing aid, said polymer being selected from the group consisting of polymers of perhalogenated olefins and copolymers of at least one of said perhalogenated olefins with at least one other highly halogenated olefin, said halogen atoms in all of said olefins being selected from the group consisting of fluorine and chlorine.

The polymers of the highly halogenated olefins which are used in the practice of the invention are polymers of perhalogenated olefins containing from 2 to 4 carbon atoms per molecule, and copolymers of at least one of said perhalogenated olefins with at least one other highly halogenated olefin containing from 2 to 4 carbon atoms per molecule and averaging not more than one hydrogen atom per atom of carbon. In all instances, the halogen atoms are selected from the group consisting of chlorine and fluorines. Polymers wherein the major number of the halogen atoms are fluorine are presently preferred. The term "polymer" as used herein and in the claims, unless otherwise specified, is used generically and includes copolymers as well as homopolymers. Thus, copolymers of two or more perhalogenated olefins are included as well as copolymers of at least one perhalogenated olefin with at least one other highly halogenated olefin having, on an average, not more than one atom of hydrogen per atom of carbon.

The terms "perfluoro," "perchloro," and "perhalogenated," as used herein and in the claims, unless otherwise specified define derivatives of carbon and hydrogen containing compounds in which all the hydrogen atoms attached to carbon in the parent compound have been replaced by halogen. For example, perfluorobutene has the formula $$C_4F_8(CF_2=CF-CF_2-CF_3), (CF_3-CF=CF-CF_3)$$

or

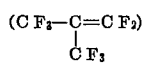

Said polymers can be prepared by various methods well known to those skilled in the art. For example, said polymers can be prepared by polymerizing said olefins at temperatures of about 70 to about 200° C. in the presence of peroxide promoters such as benzoyl peroxide and acetyl peroxide. Further details regarding the preparation of said polymers can be found in Belmore et al., "Production of Polyperfluorovinylchloride," Industrial and Engineering Chemistry, 39, 338–342 (1947) and in U.S. patents: 2,694,701, issued to Oscar A. Blum et al. on November 16, 1954; 2,784,176, issued to A. L. Dittmann on March 5, 1957; and 2,705,706, issued to A. L. Dittmann et al. on April 5, 1955. Some of said polymers of highly halogenated olefins are commercial products, commercially available under the trademark "Kel-F." The polymers of highly halogenated olefins used in the practice of the invention are preferably liquid under the conditions of use.

Examples of homopolymers of perhalogenated olefins which can be used in the practice of the invention include, among others, the homopolymers of:

Trifluoromonochloroethylene
Perfluorobutadiene
Pentafluoromonochloropropene
Perfluorobutene
Heptafluoromonochlorobutene
Perfluorocyclobutene
Perfluoroethylene
Difluorodichloroethylene, and isomers of said compounds Examples of other highly halogenated olefins containing from 2 to 4 carbon atoms per molecule and having, on an average, not more than one hydrogen atom per carbon atom, and which can be used to form copolymers with said perhalogenated olefins include, among others, the following:

$CHF=CHF$
$CF_2=CHCl$
$CF_2=CH_2$ (vinylidine fluoride)
$CCl_2=CH_2$ (vinylidine chloride)
$CFCl=CHF$
$CH_3-CCl=CF_2$
$CHCl_2-CCl=CF_2$
$CHF_2-CF=CCl_2$
$CHCl_2-CHCl-CH=CF_2$, and the like Examples of said copolymers of said perhalogenated olefins with said other highly halogenated olefins include, among others, the following: the 90/10 copolymer of trifluoromonochloroethylene with vinylidine fluoride; the 80/20 copolymer of trifluoromonochloroethylene with vinylidene copolymer; the 75/25 copolymer of perfluoroethylene with vinylidine chloride; and the 80/20 copolymer of perchloroethylene with vinylidine fluoride.

The amount of said polymers of highly halogenated olefins which is used in the practice of the invention is usually an amount within the range of 0.1 to 5 parts by weight based on the total propellant composition, preferably 0.1 to 2 parts by weight, based on the total propellant composition.

The term "rubbery polymer" as used herein and in the claims, unless otherwise specified, includes natural rubber, silicone rubber, and all rubbery polymers of olefins and diolefins which are prepared by either emulsion polymerization or mass polymerization. Some examples of suitable rubbery polymers are polybutadiene, polyisobutylene, polyisoprene, copolymers of isobutylene and isoprene, copolymers of conjugated dienes with comonomers such as styrene, and acrylonitrile, and copolymers of conjugated dienes with polymerizable heterocyclic nitrogen bases. Said copolymers of conjugated dienes with polymerizable heterocyclic bases comprise a preferred class of rubbery polymers for use in the binder component of the propellants of the invention. A presently preferred rubbery polymer is a copolymer of 1,3-butadiene with 2-methyl-5-vinylpyridine.

Said preferred class of rubbery polymers prepared by copolymerizing a conjugated diene with a heterocyclic nitrogen base can vary in consistency from very soft rubbers, i.e., materials which are soft at room temperature but will show retraction when relaxed, to those having a Mooney value (ML–4 at 212° F.) up to 100. The rubbery copolymers most frequently preferred have Mooney values in the range between 10 and 75. They may be prepared by any polymerization methods known to the art, e.g., mass or emulsion polymerization. One convenient method for preparing these copolymers is by emulsion polymerization at temperatures in the range between 0 and 140° F. Recipes such as the iron pyrophosphate-hydroperoxide, either sugar-free or containing sugar, the sulfoxylate, and the persulfate recipes are among those which are applicable. It is advantageous to polymerize to high conversion as the unreacted vinylpyridine monomer is difficult to remove by stripping.

The conjugated dienes employed are those containing from 4 to 10 carbon atoms per molecule and include 1,3-butadiene, isoprene, 2-methyl-1,3-butadiene, and the like. Various alkoxy, such as methoxy and ethoxy and cyano derivatives of these conjugated dienes, are also applicable. Thus, other dienes, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, are also applicable.

Instead of using a single conjugated diene, a mixture of conjugated dienes can be employed. Thus, a mixture of 1,3-butadiene and isoprene can be employed as the conjugated diene portion of the monomer system.

The polymerizable heterocyclic nitrogen bases which are applicable for the production of the polymeric materials are those of the pyridine, quinoline, and isoquinoline series which are copolymerizable with a conjugated diene and contain one, and only one,

substituent wherein R' is either hydrogen or a methyl group. That is, the substituent is either a vinyl or an alpha-methylvinyl (isopropenyl) group. Of these, the compounds of the pyridine series are of the greatest interest commercially at present. Various substituted derivatives are also applicable but the total number of carbon atoms in the groups attached to the carbon atoms of the heterocyclic nucleus should not be greater than 15 because the polymerization rate decreases somewhat with increasing size of the alkyl group. Compounds where the alkyl substituents are methyl and/or ethyl are available commercially.

These heterocyclic nitrogen bases have the formula

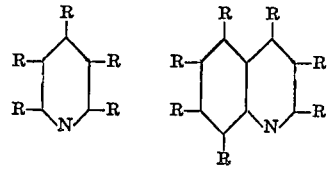

or

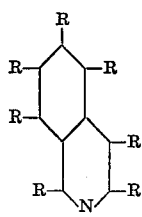

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 15. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2,4-dimethyl-5,6-dipentyl-3-vinylpyridine; 2-decyl-5-(alpha-methylvinyl)pyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenylpyridine; 2-(para-methyl-phenyl)-3-vinyl-4-methylpyridine; 3-vinyl-5-(hydroxyphenyl)-pyridine; 2-vinylquinoline; 2-vinyl-4-ethylquinoline; 3-vinyl-6,7-di-n-propylquinoline; 2-methyl-4-nonyl-6-vinylpyridine; 4-(alpha-methylvinyl)-8-dodecylquinoline; 3-vinylisoquinoline; 1,6-dimethyl-3-vinyl-isoquinoline; 2-vinyl-4-benzylquinoline; 3-vinyl-5-chloroethylquinoline - 3 - vinyl - 5,6 - dichloroisoquinoline; 2 - vinyl-6-ethoxy-7-methylquinoline; 3-vinyl-6-hydroxymethylisoquinoline; and the like:

Another preferred rubbery polymer which can be employed in the binder of the solid propellant composition of this invention is a copolymer of 1,3-butadiene with styrene. Such copolymers are commonly known in the art as GR–S rubbers. Said GR–S rubbers can be prepared by any of the well known methods employing well known recipes. Any of the well known GR–S rubbers containing from 1 to 2 and up to about 25 parts of styrene can be used in the practice of the invention. The GR–S rubber designated as 1505 is one preferred copolymer for use in the practice of the invention. GR–S 1505 can be prepared by copolymerizing 1,3-butadiene with styrene at 41° F. using a sugar free, iron-activated, rosin-acid emulsified system. A charge weight ratio of butadiene to styrene is 90/10 and the polymerization is allowed to go to aproximately 52 percent completion. The copolymer is then salt acid coagulated and usually has a mean raw Mooney value (ML–4) of about 40. Said copolymers usually have a bound styrene content of about 8 weight percent. Further details regarding the preparation of GR–S rubbers can be found in Industrial and Engineering Chemistry, 40, pages 769–777 (1948), and United States Patents 2,583,277; 2,595,892; 2,609,362; 2,614,100; 2,647,109; and 2,665,269.

The binder contains rubbery polymers of the type hereinbefore described and, in addition, there can be present one or more reinforcing agents, plasticizers, wetting agents, and antioxidants. Other ingredients which are employed for sulfur vulcanization include a vulcanization accelerator, a vulcanizing agent, such as sulfur, and an accelerator activator, such as zinc oxide. The finished binder usually contains various compounding ingredients. Thus, it will be understood that herein and in the claims, unless otherwise specified, the term "binder" is employed generically and includes various conventional compounding ingredients. The binder content of the propellant composition will usually range from 3.5 to 30 parts by weight based on the total propellant composition.

The copolymer comprising a conjugated diene and a polymerizable heterocyclic nitrogen base can also be cured by a quaternization reaction by incorporating therein a quaternizing agent and subjecting the resulting mixture to quaternizing conditions of temperature. Suitable quaternizing agents include alkyl halides such as methyl iodide, methyl bromide; alkylene halides such as methylene iodide, ethylene bromide; substituted alkanes such as chloroform, bromoform, alkyl sulfates such as methyl sulfate; and various substituted aromatic compounds such as benzoyl chloride, methyl benzene sulfonate, benzotrichloride, benzyl chloride, benzal chloride, hexachloro-p-xylene, and the like.

The quaternizing temperature is usually in the range zero to 250° F., although temperatures outside this range can be used.

A general formulation for the binder component of the propellant composition of the invention is as follows:

|  | Parts by weight |
| --- | --- |
| Rubbery polymer | 100 |
| Reinforcing agent | 0–50 |
| Plasticizer | 0–100 |
| Wetting agent | 0–10 |
| Antioxidant | 0–3 |
| Vulcanization accelerator | 0–5 |
| Sulfur | 0–2 |
| Quaternizing agent | 0–25 |
| Metal oxide | 0–5 |

Reinforcing agents which can be employed include carbon black, wood flour, lignin, and various reinforcing resins such as styrene-divinylbenzene, methyl acrylate-divinylbenzene, acrylic acid-styrene-divinylbenzene, and methyl acrylate-acrylic acid-divinylbenzene resins.

In general, any rubber plasticizer can be employed in the binder compositions. Materials such as Pentaryl A (amylbiphenyl), Paraflux (saturated polymerized hydrocarbon), Circosol-2XH (petroleum hydrocarbon softener having a specific gravity of 0.940 and a Saybolt Universal viscosity at 100° F. of about 2000 seconds), di(1,4,7-trioxaundecy)methane, and dioctyl phthalate are suitable plasticizers. Materials which provide a rubber having good low temperature properties are preferred. It is also frequently preferred that the plasticizers be oxygen-containing materials.

Wetting agents aid in deflocculating or dispersing the oxidizer. Aerosol OT (dioctyl ester of sodium sulfosuccinic acid), lecithin, and Duomeen C diacetate (the diacetate of trimethylenediamine substituted by a coconut oil product) are among the materials which are applicable.

Antioxidants which can be employed include Flexamine (physical mixture containing 65 percent of a complex diarylamine-ketone reaction product and 35 percent of N,N' - diphenyl-p-phenylenediamine), phenyl-beta-naphthylamine, 2,2-methylene - bis(4-methyl - 6 - tert - butylphenol), and the like. Rubber antioxidants, in general, can be employed or if desired can be omitted.

Examples of vulcanization accelerators are those of the carbamate type, such as N,N-dimethyl-S-tert-butylsulfenyl dithiocarbamate and Butyl-Eight. Butyl-Eight is a rubber accelerator of the dithiocarbamate type supplied by the R. F. Vanderbilt Company and described in "Handbook of Material Trade Names" by Zimmerman and Lavine, 1953 Edition, as a brown liquid; specific gravity 1.01; partially soluble in water and gasoline; and soluble in acetone, alcohol, benzol, carbon disulfide and chloroform.

It is to be understood that each of the various types of compounding ingredients can be used singly or mixtures of various ingredients performing a certain function can be employed. It is sometimes preferred, for example, to use mixtures of plasticizers rather than a single material.

The propellant compositions of the invention will preferably contain, in addition to the oxidizer component, the binder component, and the high energy additive component, a burning rate catalyst. Any suitable burning rate catalyst can be used in the propellant compositions of the invention. It is preferred that the burning rate catalyst be as finely divided as possible, preferably having a particle size of less than 20 microns. Burning rate catalysts applicable in the practice of the invention include ammonium dichromate, iron oxide, copper, chromite, Milori blue, and the like. Metal ferrocyanides and ferricyanides can also be used. Ferric ferrocyanides, such as Prussian, Berlin, Hamburg, Chinese, Paris and Milori blue (mentioned above), soluble ferric ferrocyanide such as soluble Berlin or Prussian blue which contains potassium ferric ferrocyanide and ferric ferrocyanide which has been treated with ammonia, are among the materials which can also be used. Ferrous ferricyanide (Turnbull's blue) is also applicable. Milori blue, mentioned above, is a pigment similar to Prussian blue but having a red tint and is prepared by the oxidation of a paste of potassium ferrocyanide and ferrous sulfate. Other metal compounds such as nickel and copper ferrocyanides can also be employed. The amount of burning rate catalyst used in the propellant compositions of the invention can be within the range of 0 to 5 parts by weight based on the total composition.

Finely divided high energy additives can also be included in the propellant compositions of the invention. Examples of suitable finely divided high energy additives include boron, magnesium, aluminum, iron, beryllium, lithium, alloys of aluminum, alloys of magnesium, and mixtures of said additives. The use of finely divided high energy additives is disclosed and claimed in my copending application, Serial No. 743,465, filed June 20, 1958, now U.S. Patent No. 2,995,431, issued August 8, 1961. The amount of said high energy additives employed in the propellant compositions of the present invention can range from 0 to 25 parts by weight based on the total propellant composition. It is preferred that said finely divided high energy additives have a particle size less than 50 microns, more preferably less than 20 microns, and still more preferably less than 10 microns.

Oxidizers which are applicable in the solid propellant compositions of the invention include ammonium perchlorate, the alkali metal perchlorates, ammonium nitrate, and the alkali metal nitrates. As used herein, the term "alkali metal" includes sodium, potassium, lithium, cesium, and rubidium. Ammonium nitrate and ammonium perchlorate are the presently preferred oxidizers. Mixtures of said oxidizers are also applicable. In the preparation of the solid rocket propellant compositions the oxidizers are usually ground to a particle size preferably within the range between 20 and 200 microns average particle size. The most preferred particle size is from about 40 to about 60 microns. The amount of oxidizer used is a major amount of the total composition and is usually within the range of about 60 to about 94 parts by weight per 100 parts of the total compositions. When ammonium nitrate is used as the oxidizer component, it is frequently preferred to use a phase stabilized ammonium nitrate. One method of phase stabilizing ammonium nitrate comprises mixing about 10 parts by weight of a potassium salt (usually potassium nitrate) with about 90 parts by weight of ammonium nitrate along with some water, heating the mixture to about 140–150° F., drying, and then grinding the mixture to the desired particle size.

When ammonium nitrate and/or an alkali metal nitrate is used as the oxidizer component, it is preferred that the amount of oxidizer in the propellant composition be an amount within the range of about 70 to about 94 parts by weight per 100 parts of the total composition. When ammonium perchlorate and/or an alkali metal perchlorate is used as the oxidizer component of the propellant composition of the invention, it preferred that the amount of oxidizer in the propellant composition be an amount within the range of about 60 to about 90 parts by weight per 100 parts of the total composition. Thus, a general formulation for the propellant compositions of the invention is as follows:

| Component | Parts by Weight per 100 Parts of Total Composition | | |
|---|---|---|---|
| | Broad Range | Preferred Range Nitrate Type | Preferred Range Perchlorate Type |
| (1) Binder | 3.5–30 | 3.5–30 | 8–30 |
| (2) Oxidizer | 60–94 | 70–94 | 60–90 |
| (3) Processing aid | 0.1–5 | 0.1–5 | 0.1–5 |
| (4) Catalyst | 0–5 | 0–5 | 0–5 |
| (5) High energy additive | 0–25 | 0–25 | 0–25 |
| Total of (2), (4), and (5), Maximum | 96.4 | 96.4 | 91.9 |

The following example will serve to further illustrate the invention.

EXAMPLE

A rubbery copolymer was prepared by emulsion polymerization of 1,3-butadiene and 2-methyl-5-vinylpyridine at 41° F. The polymerization recipe was as follows:

*Recipe*

| | Parts by weight |
|---|---|
| 1,3-butadiene | 90 |
| 2-methyl-5-vinylpyridine | 10 |
| Water | 200 |
| Potassium soap | 6 |
| Potassium chloride | 0.1 |
| Sodium salt of condensed alkylaryl sulfonic acid | 0.3 |
| Tetrasodium salt of ethylenediaminetetraacetic acid | 0.005 |
| Tertiary dodecyl mercaptan (modifier) | 0.6–0.8 |
| Ferrous sulfate heptahydrate | 0.2 |
| Potassium pyrophosphate | 0.253 |
| Para-menthane hydroperoxide | 0.135 |

A total of 55 runs were made using the above recipe. The average conversion for these runs as 85 percent in 17.0 hours. The polymerization was shortstopped with 0.15 part by weight per 100 parts by weight of rubber of potassium dimethyl dithiocarbamate, and 1.75 parts by weight per 100 parts by weight of rubber of phenyl-beta-naphthylamine was added as a stabilizer. The latex was masterbatched with 19.5 parts by weight of a low abrasion furnace carbon black per 100 parts by weight of rubber. The black masterbatch was then coagulated with acid, the crumb was washed with water, and then dried.

The carbon black content of the above-described copolymer product was increased to 22 parts by weight per 100 parts by weight of rubber by milling an additional 2.5 parts of said carbon black into said copolymer. Three parts by weight per 100 parts by weight of rubber of Flexamine, a physical mixture containing 65% of a complex diarylamine-ketone reaction product and 35% of N,N'-diphenyl-p-phenylenediamine, was also milled into said copolymer.

The thus prepared rubber masterbatch was used to prepare a binder having the following composition in parts per 100 parts of rubber or parts by weight:

| | Parts by weight |
|---|---|
| 90/100 copolymer | 100 |
| Carbon black (Philblack A) | 22 |
| Phenyl-beta-naphthylamine | 1.75 |
| Flexamine | 3 |

Said binder was used as the binder component to prepare three propellant compositions A, B, and C as given in Table I below. The oxidizer used in the preparation of said propellants was phase stabilzed ammonium nitrate. This was produced by mixing 90 parts of ammonium nitrate with 10 parts of potassium nitrate and 0.2 part of water. The mixture thus formed was then heated 24 hours at 150° F. and ground to a weight average particle size of 60 microns. In preparing propellant A, the oxidizer was mixed with the burning rate catalyst (ammonium dichromate) which had a weight average size of 18 microns. The mixture of oxidizer and catalyst thus formed was added slowly to the binder and mixing was effected in a Baker-Perkins mixer. The resulting uniform mixture having the oxidizer and catalyst dispersed in said binder was placed in an extruder equipped with a die having a diameter of 0.5 inch. A pressure of 9600 p.s.i.g. was applied on the propellant and the rate of extrusion in inches per minute was recorded.

In preparing propellant B, the liquid polybutadiene was first mixed with the binder in a Baker-Perkins mixer for about 5 or 6 minutes. A dry blend of the oxidizer and the catalyst mixed together was then slowly incorporated into said binder which contained the liquid polybutadiene.

In the preparation of propellant C, the liquid polybutadiene was first mixed with the binder in a Baker-Perkins mixer as described above in connection with propellant B. The oxidizer and burning rate catalyst were then dry blended together and the halogenated polymer oil was added to this blend. The oxidizer and catalyst mixture was then added to the binder mixture slowly.

Results of extrusion tests on all three of said propellants A, B, and C are given below in Table I.

TABLE I.—COMPOSITION AND EXTRUSION RATES OF PROPELLANTS A, B, AND C

| Ingredient | Parts By Weight | | |
|---|---|---|---|
| | A | B | C |
| Binder | 7 | 5 | 5 |
| Oxidizer | 92 | 92 | 91 |
| Catalyst | 1 | 1 | 1 |
| Liquid polybutadiene [1] | 0 | 2 | 2 |
| Halogenated polymer oil [2] | 0 | 0 | 1 |
| Extrusion rate, in./min | negligible | 4 | 27 |

[1] From sodium-catalyzed polymerization of 1,3-butadiene as described by Crouch et al., Ind. Eng. Chem., vol. 47, 2091-5 (1955). The product has a viscosity of about 2500 cp. at 100° F.

[2] Homopolymer of trifluoromonochloroethylene. A light oil having an initial boiling point at 1 mm. of mercury pressure of 230° F. and a pour point below −70° F. Available commercially as Kel-F oil No. 1.

The data in Table I show that propellant A had a negligible extrusion rate. Propellant B, which is the same as propellant A except that two parts per 100 parts of propellant of liquid polybutadiene have replaced two parts of the copolymer binder, had an extrusion rate of four inches per minute. It should be noted that while an increase in the amount of liquid polybutadiene would have increased the extrusion rate of propellant B, such propellant compositions having higher concentrations of liquid polybutadiene are not always entirely satisfactory since the propellant sometimes has a tacky surface and the liquid polybutadiene sometimes tends to bleed from the composition. These difficulties do not exist with propellant compositions such as propellant C. The use of one part of the halogenated polymer oil and two parts of the liquid polybutadiene produced a propellant composition having a non-tacky surface and which would extrude at an extrusion rate of 27 inches per minute.

Typical properties of representative halogenated polymer oils are given in Table II below.

TABLE II.—HALOGENATED POLYMER OILS

| | No. 1 [1] | No. 3 [1] | No. 10 [1] |
|---|---|---|---|
| Molecular Weight | 500 | 630 | 780 |
| Color | colorless | colorless | colorless |
| Viscosity, cs.: | | | |
| 100° F | 3 | 25 | 220 |
| 210° F | 1 | 3 | 10 |
| Pour Point, ° F | <−70 | −45 | +30 |
| Specific Gravity, 68° F./39° F | 1.86 | 1.93 | 1.96 |

[1] Homopolymers of trifluoromonochloroethylene. Available commercially as Kel-F Oil No. 1, Kel-F Oil No. 3, and Kel-F Oil No. 10, respectively.

Properties of a typical liquid polybutadiene (Butarez*-25) prepared in accordance with the method of Crouch, referred to above, are given in Table III below.

TABLE III.—PROPERTIES OF LIQUID POLYBUTADIENE

| | |
|---|---|
| Specific gravity, 60/60 | 0.9059 |
| Density at 60° F., lbs./gal. | 7.5 |
| Refractive index, $n_D^{20}$ | 1.5174 |
| Iodine number | 365–385 |
| Color, Gardner | 11 |
| Ash, wt. percent | 0.05 |
| Volatile material, wt. percent | 1.0 |
| Saybolt Furol viscosity @ 100° F. | 2500 |

As will be apparent to those skilled in the art, various other modifications of the invention can be made or followed in view of the above disclosure, without departing from the spirit and scope of said invention.

I claim:

1. A solid propellant composition comprised of, in parts by weight per 100 parts of the total composition: from 3.5 to 30 parts of a binder component comprising a rubbery polymer; from 60 to 94 parts of an oxidizer component selected from the group consisting of ammonium nitrate, the alkali metal nitrates, ammonium perchlorate, the alkali metal perchlorates, and mixtures thereof; from 0 to 5 parts of a burning rate catalyst; from 0.1 to 5 parts of a polymer of a highly halogenated olefin as a processing aid, said polymer being selected from the group consisting of polymers of perhalogenated olefins containing from 2 to 4 carbon atoms per molecule and copolymers of at least one of said perhalogenated olefins with at least one other highly halogenated olefin containing from 2 to 4 carbon atoms per molecule and averaging not more than one hydrogen atom per atom of carbon, said halogen atoms in all of said olefins being selected from the group consisting of fluorine and chlorine; and from 0 to 25 parts of a finely divided high energy additive selected from the group consisting of boron, magnesium, aluminum, iron, beryllium, lithium, alloys of aluminum, alloys of magnesium, and mixtures thereof; the total amount of said oxidizer, said catalyst and said high energy additive not exceeding 96.4 parts by weight.

2. A propellant composition according to claim 1 wherein: said oxidizer component is selected from the group consisting of ammonium nitrate, the alkali metal nitrates, and mixtures thereof; and the amount of said oxidizer component is from 70 to 94 parts.

3. A propellant composition according to claim 1 wherein: said oxidizer component is selected from the group consisting of ammonium perchlorate, the alkali metal perchlorates, and mixtures thereof; the amount of said oxidizer component is from 60 to 90 parts; and the total amount of said oxidizer, said catalyst, and said high energy additive does not exceed 90 parts.

4. A propellant composition according to claim 2 wherein said processing aid is a polymer of trifluoromonochloroethylene.

5. A propellant composition according to claim 3 wherein said processing aid is a polymer of trifluoromonochloroethylene.

6. A propellant composition according to claim 2 wherein said processing aid is a copolymer of trifluoromonochloroethylene with vinylidine fluoride.

7. A propellant composition according to claim 3 wherein said processing aid is a copolymer of trifluoromonochloroethylene with vinylidine fluoride.

8. A propellant composition according to claim 2 wherein said processing aid is a polymer of perfluoroethylene.

9. A propellant composition according to claim 3 wherein said processing aid is a polymer of perfluoroethylene.

10. A propellant composition according to claim 2 wherein said processing aid is a copolymer of perfluoroethylene and vinylidine chloride.

11. A propellant composition according to claim 3 wherein said processing aid is a copolymer of perfluoroethylene and vinylidine chloride.

12. A propellant composition according to claim 2 wherein said processing aid is a polymer of perfluorobutene.

13. A propellant composition according to claim 3 wherein said processing aid is a polymer of perfluorobutene.

14. A propellant composition according to claim 2 wherein said processing aid is a polymer of perfluorobutadiene.

15. A propellant composition according to claim 4 wherein said rubbery polymer of said binder component is a copolymer of (a) a conjugated diene containing from 4 to 10 carbon atoms per molecule and (b) a

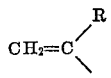

substituted heterocyclic nitrogen base selected from the group consisting of pyridine, quinoline, alkyl substituted pyridine, and alkyl substituted quinoline wherein the total number of carbon atoms in the nuclear alkyl substituents is not more than 15 and wherein R is selected from the group consisting of hydrogen and a methyl radical.

16. A propellant composition according to claim 15 wherein said copolymer is a copolymer of 1,3-butadiene and 2-methyl-5-vinylpyridine.

17. A propellant composition according to claim 5 wherein said rubbery polymer of said binder component is a copolymer of (a) a conjugated diene containing from 4 to 10 carbon atoms per molecule and (b) a

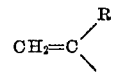

substituted heterocyclic nitrogen base selected from the group consisting of pyridine, quinoline, alkyl substituted pyridine, and alkyl substituted quinoline wherein the total number of carbon atoms in the nuclear alkyl substituents is not more than 15 and wherein R is selected from the group consisting of hydrogen and a methyl radical.

18. A propellant composition according to claim 17 wherein said copolymer is a copolymer of 1,3-butadiene and 2-methyl-5-vinylpyridine.

References Cited in the file of this patent

UNITED STATES PATENTS

| | | |
|---|---|---|
| 2,622,277 | Bonell et al. | Dec. 23, 1952 |
| 2,877,504 | Fox | May 17, 1958 |
| 2,857,258 | Thomas | Oct. 21, 1958 |

OTHER REFERENCES

Chem. and Eng. News, October 7, 1957 pp. 62–3.
Chem. and Eng. News (I), May 27, 1957, pp. 18–23.
Modern Plastics Encyclopedia and Engineer's Handbook (1953), Plastics Catalogue Corp., 575 Madison Ave., N.Y., N.Y., p. 99.